Sept. 27, 1960          F. F. DE MERS          2,954,064
MACHINE FOR FORMING RING REINFORCED CONVOLUTIONS IN A TUBE
Original Filed Nov. 10, 1950          8 Sheets-Sheet 1
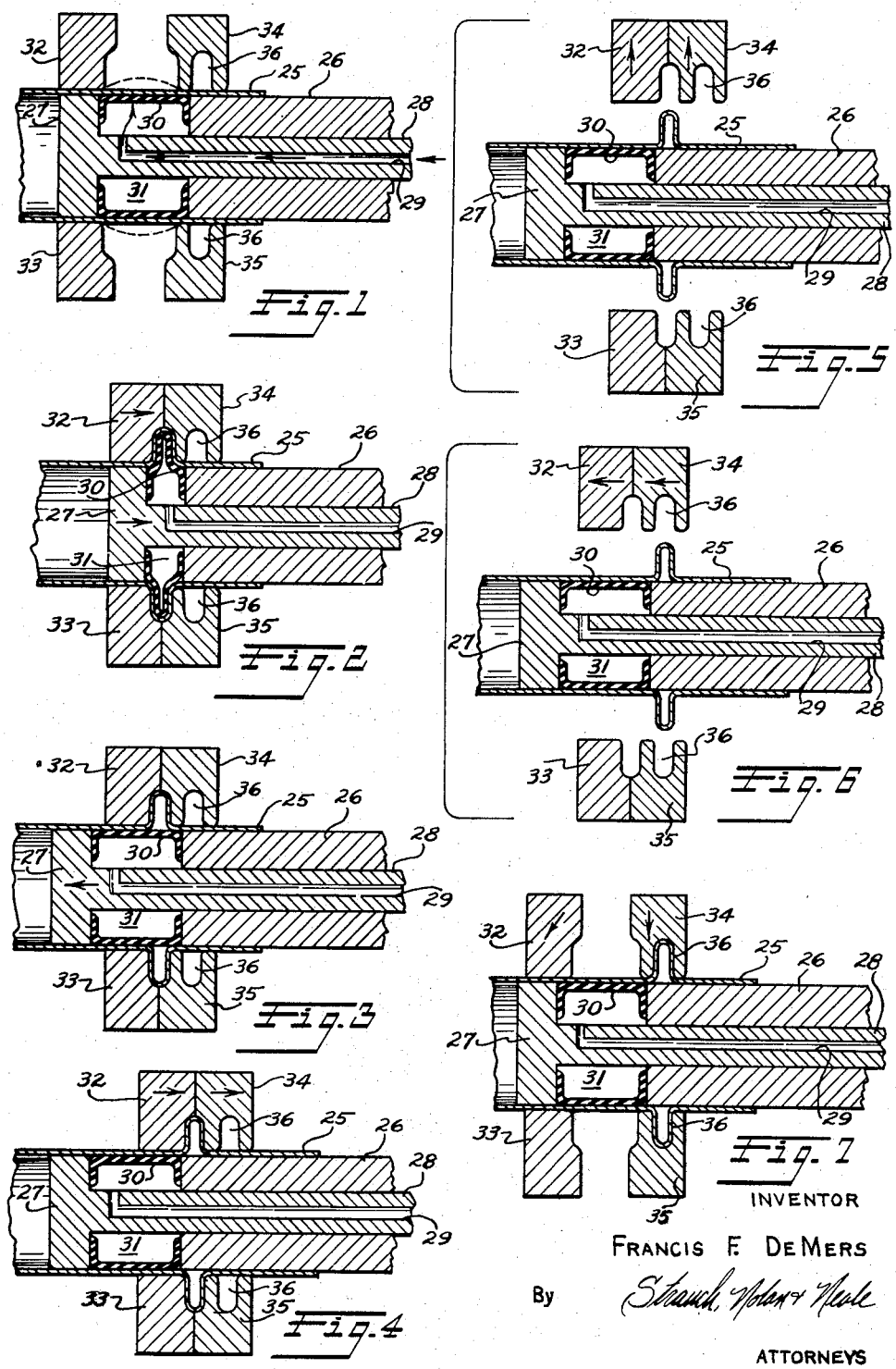
INVENTOR
FRANCIS F. DE MERS
ATTORNEYS Sept. 27, 1960 F. F. DE MERS 2,954,064
MACHINE FOR FORMING RING REINFORCED CONVOLUTIONS IN A TUBE
Original Filed Nov. 10, 1950 8 Sheets-Sheet 2

INVENTOR
FRANCIS F. DeMERS
By Strauch, Nolan & Neale
ATTORNEYS

INVENTOR
FRANCIS F. DEMERS

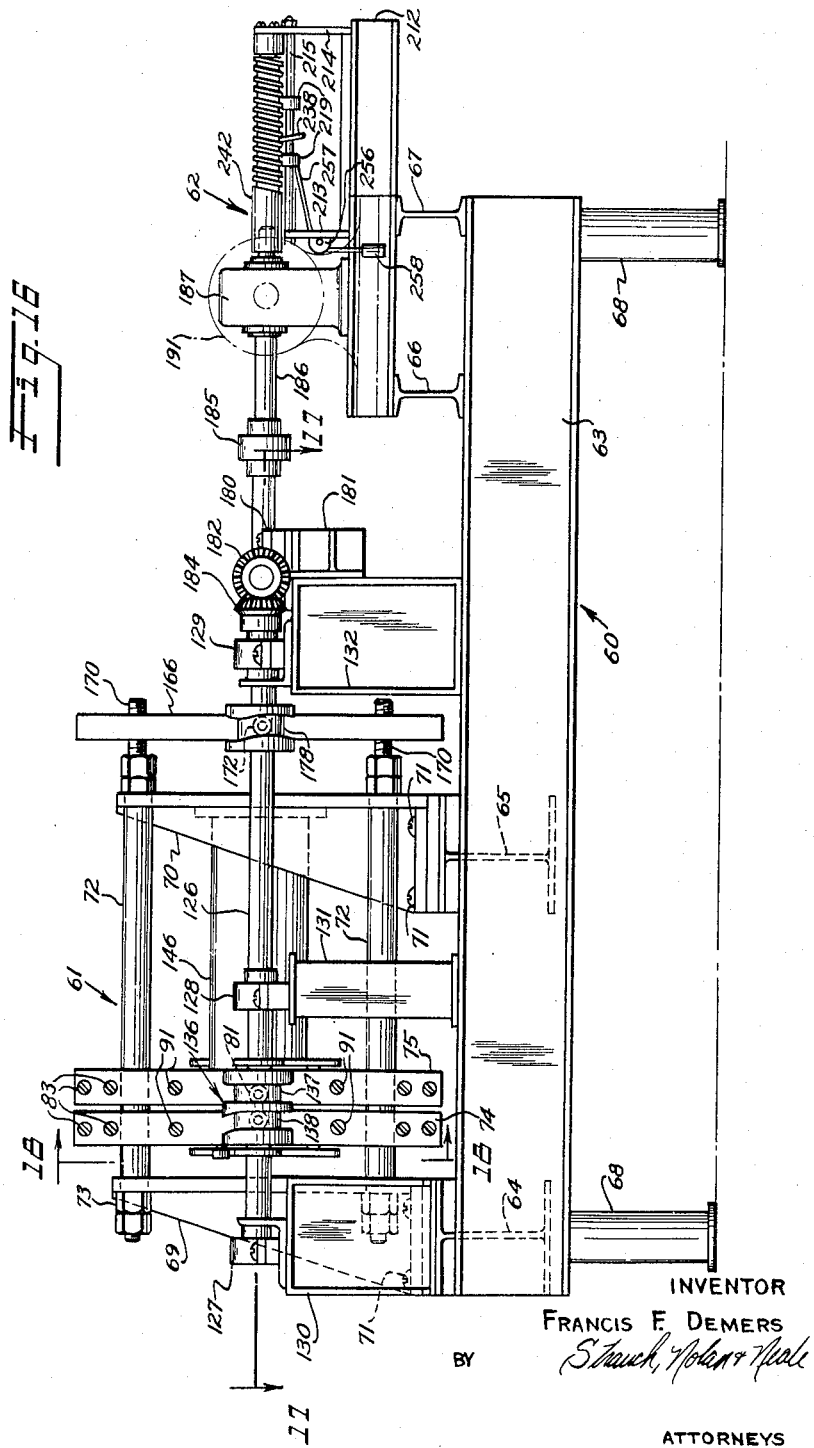

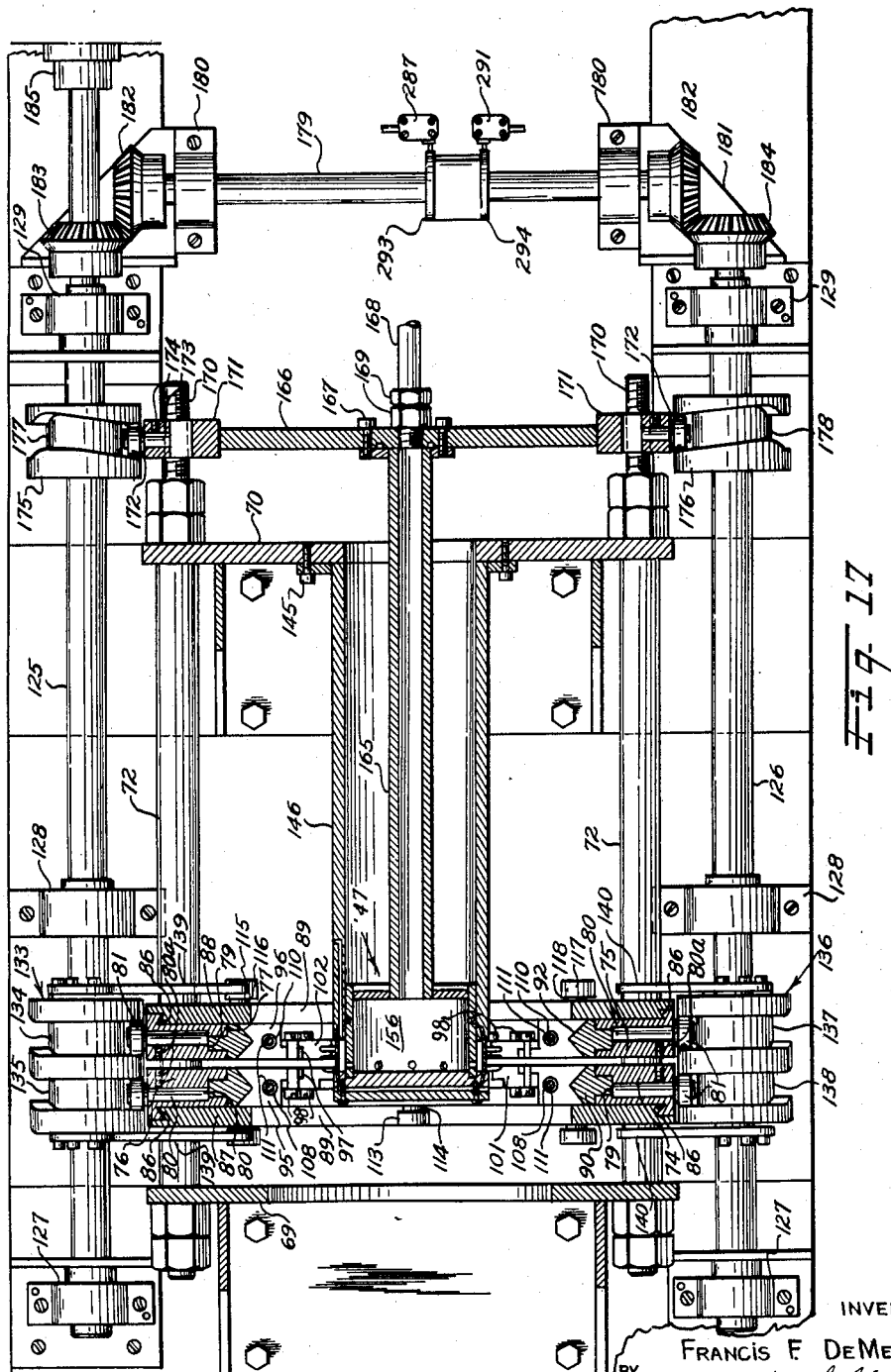

Sept. 27, 1960      F. F. DE MERS      2,954,064
MACHINE FOR FORMING RING REINFORCED CONVOLUTIONS IN A TUBE
Original Filed Nov. 10, 1950      8 Sheets-Sheet 6
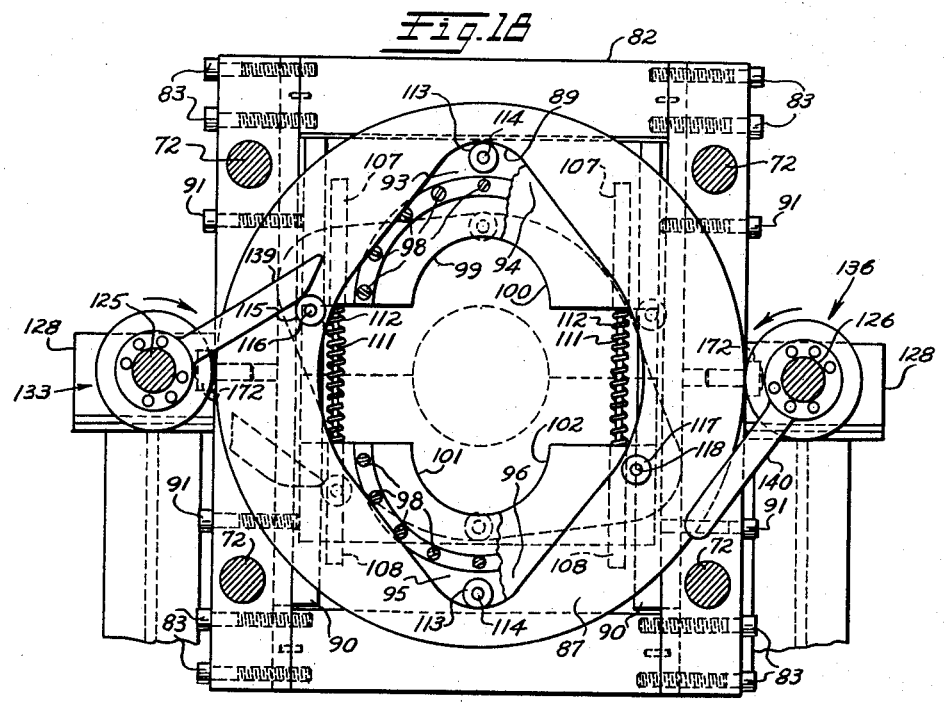
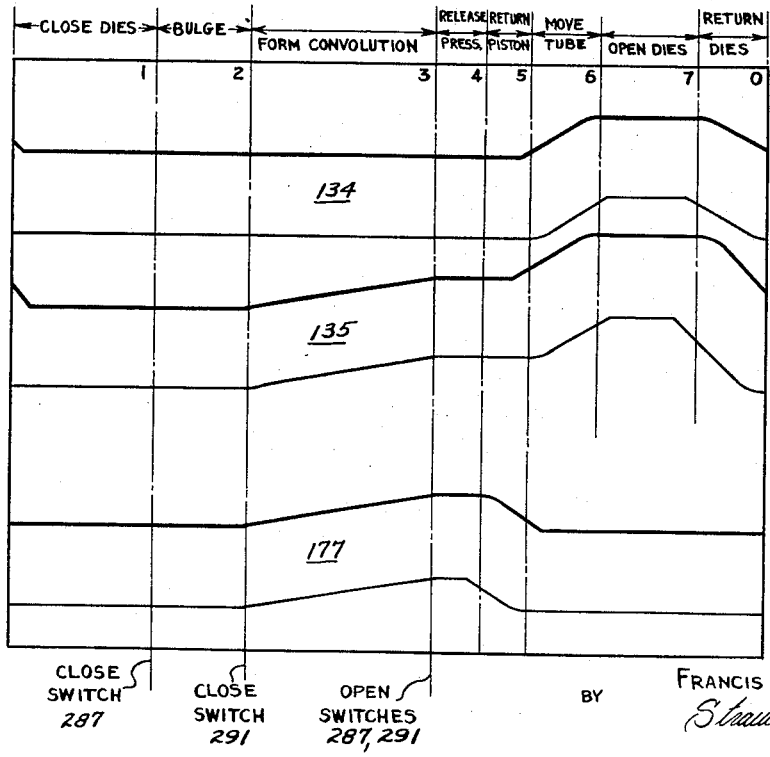
INVENTOR
FRANCIS F. DeMERS
ATTORNEYS

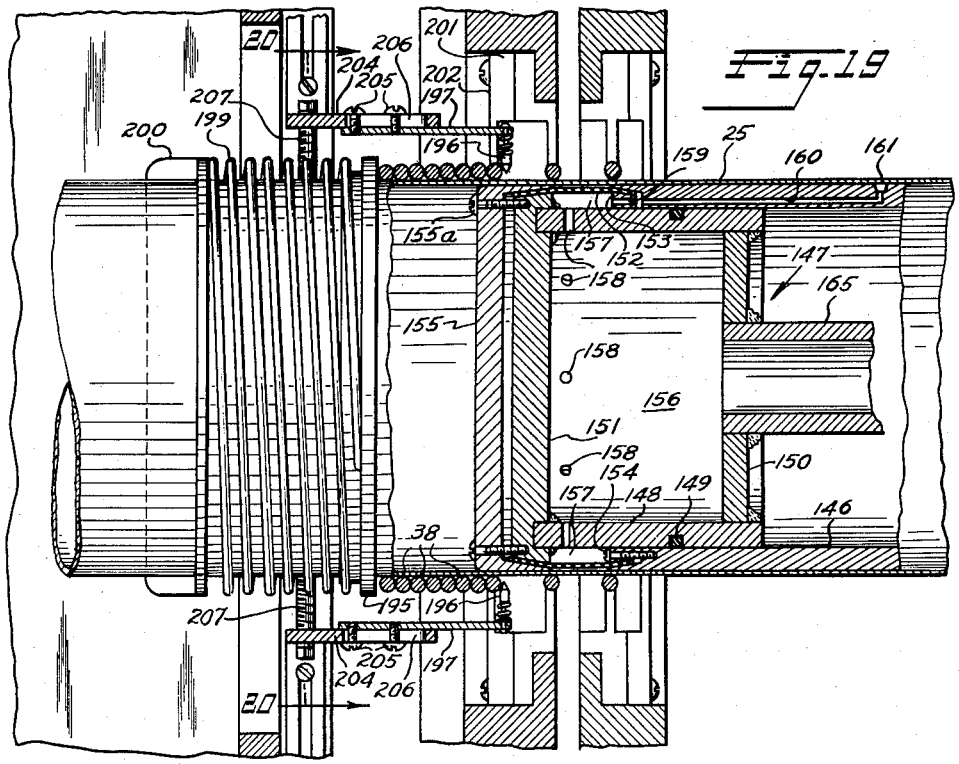
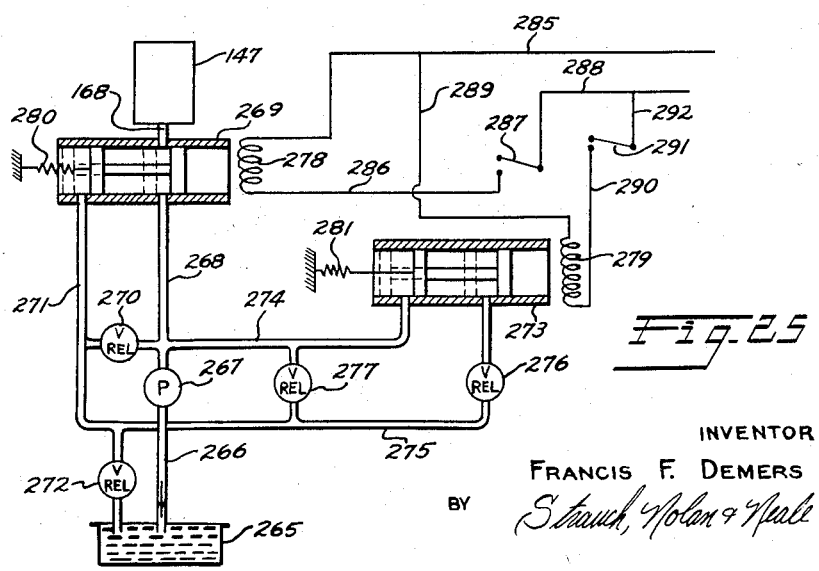

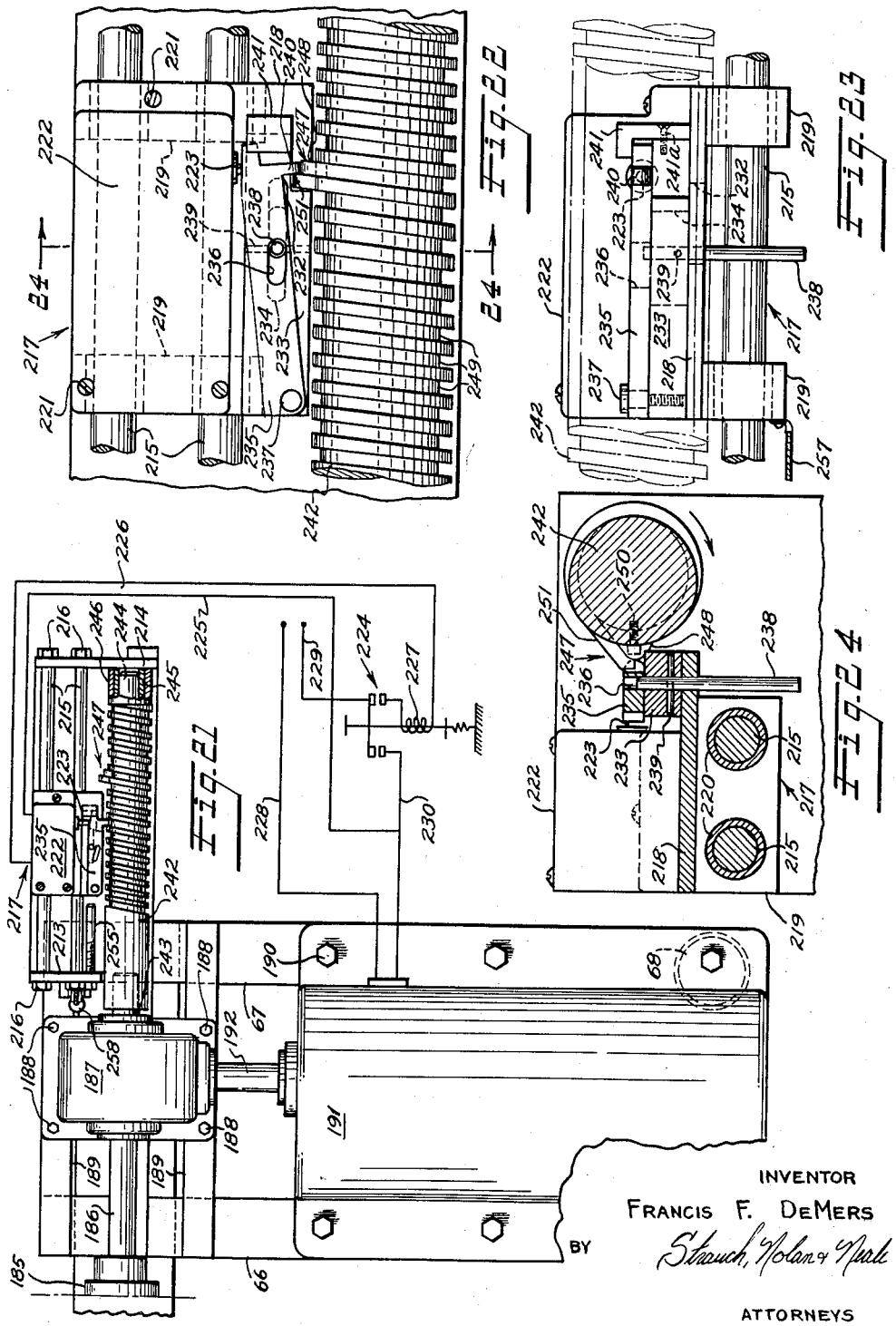

United States Patent Office 2,954,064
Patented Sept. 27, 1960

2,954,064

MACHINE FOR FORMING RING REINFORCED CONVOLUTIONS IN A TUBE

Francis F. De Mers, Escondido, Calif., assignor to Solar Aircraft Company, San Diego, Calif., a corporation of California Original application Nov. 10, 1950, Ser. No. 195,033, now Patent No. 2,773,538, dated Dec. 11, 1956. Divided and this application Apr. 6, 1956, Ser. No. 576,631

9 Claims. (Cl. 153—2)

This invention relates to sheet metal construction and to methods and apparatus for forming sheet metal and more particularly to methods and apparatus for continuously and automatically forming a series of single convolutions in a tubular workpiece and to the products of such methods and apparatus.

It is of primary importance that the wall structure of bellows type expansible units be capable of withstanding relatively high pressure differentials between their inner and outer surfaces and at the same time be capable of performing a high number of flexures without weakening or failure. It is also desirable that walls of the bellows be as thin as possible to provide maximum sensitivity to minute variations in the pressure applied to one of their surfaces.

One of the most common causes of failure of such a thin walled bellows is the presence of minute scratches in the bellows wall caused by unavoidable imperfections in the forming dies. These scratches are magnified in use, and, in time, become cracks which lead to bellows failure.

Another cause of premature bellows failure is nonuniformity in wall thickness produced in the ordinary die forming operation. For example, where the convolutions are formed by the action of pairs of opposing metallic dies, excessive localized drawing is practically unavoidable. Repeated flexure of the excessively thinned portions of the wall surface appreciably accelerates failure of the bellows.

According to the present invention a tubular workpiece is formed as desired by bending the workpiece into a metallic female die by means of controlled expansion of a "liquid mandrel" in the form of a flexible expansible chamber. The workpiece is advanced through the machine by the action of the dies which are returned automatically to their operating position.

After a predetermined number of single annular deformations are made in the workpiece, the machine is automatically stopped and returned to its initial position by automatic means which form an important part of the present invention.

As will appear more fully hereinafter, the novel utilization of fluid pressure forming apparatus eliminates the objectionable drawing and scoring of the workpiece invariably associated with prior art methods and permits the formation of an expansible tubular item of superior quality having a substantially extended useful life.

Accordingly, it is a primary object of the present invention to provide improved methods and means for forming convolutions with a minimum of drawing and scoring to produce an expansible wall structure of substantially uniform thickness having a relatively smooth surface.

It is a further object to provide improved methods and means for forming convoluted surfaces continuously and automatically.

It is another object to provide improved methods and apparatus for forming convoluted surfaces which possess extreme flexibility with respect to the number, size and configuration of the convolutions.

It is a more specific object to provide improved methods and apparatus for die-forming convoluted surfaces in which one of the dies has a preformed shape and the other die is deformable.

It is a further object to provide a novel stopping means for a convolution forming machine to automatically stop and reset the machine after a predetermined number of convolutions have been formed.

It is another object to provide a novel convolutioned sheet metal construction having a high strength to weight ratio and an extended useful life.

It is also an object to provide novel method and means for forming a number of convoluted surfaces of widely varying configuration.

It is a further object to provide methods and apparatus for forming convolutions and simultaneously positioning stiffening means between adjacent convolutions.

It is a further object to provide a simple, structurally rugged apparatus for forming convoluted surfaces.

Further objects and advantages will become apparent as the description proceeds in connection with the accompanying drawings in which:

Figures 1 to 7 illustrate the successive steps of the improved method of forming convoluted surfaces in metal tubing;

Figure 16 is a side elevation of an apparatus for carrying out the improved method;

Figure 17 is a top plan view, partly in section of a portion of the apparatus of Figure 16, taken along line 17—17 of Figure 16;

Figure 18 is a fragmentary sectional view taken along line 18—18 of Figure 16;

Figure 19 is a fragmentary sectional view of a portion of the apparatus illustrated in Figure 17 and illustrating a modification for carrying out the method of Figures 8–14;

Figure 21 is a continuation of Figure 17 showing a top plan view of a portion of the apparatus of Figure 16;

Figure 22 is an enlarged fragmentary view of details of Figure 21;

Figure 23 is a side elevation of the mechanism of Figure 22;

Figure 24 is a fragmentary sectional view taken along line 24—24 of Figure 22;

Figure 25 is a diagrammatic illustration of an automatic control circuit for the apparatus of Figure 16; and Figure 26 is a developed view of the control cam surfaces of the improved mechanism illustrating the sequential operation of the various control elements.

Figure 8:
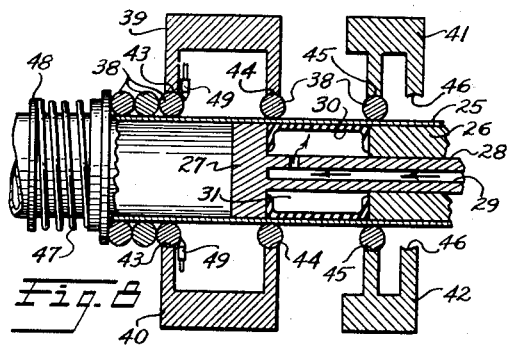
Figures 8 to 14 are similar views illustrating a method in which metal reinforcing rings are automatically assembled between adjacent convolutions.
Figure 12:
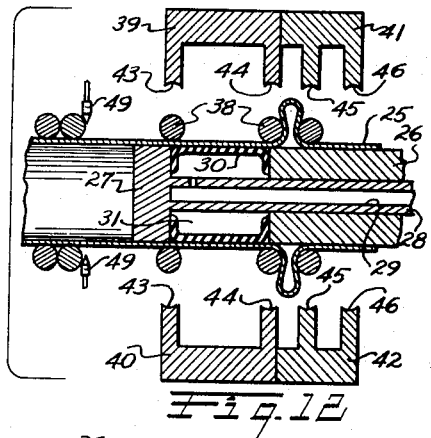

Referring now to Figures 1 to 7, a workpiece 25, in the present instance, a metallic tube, is shown positioned on the end of a stationary guide 26 whose diameter is substantially equal to the inner diameter of the workpiece. Also positioned within the workpiece is a movable piston 27 of the same diameter as guide 26. A piston rod 28, having an internal bore 29, is rigidly attached to piston 27 and is reciprocably received within an internal bore of guide 26 with which it is sealingly engaged. An annular flexible gasket 30, preferably of neoprene or similar plastic, extends between and is sealingly bonded to piston 27 and guide 26 and thus defines a sealed chamber 31. A pair of laterally and longitudinally movable female dies 32 and 33 loosely engage the workpiece 25 about its entire circumference. A second pair of female dies 34 and 35 similarly engage the workpiece 25 in an area longitudinally spaced from dies 32 and 33.

With the apparatus in the position of Figure 1, fluid under pressure is supplied to the interior of chamber 31 through passage 29 extending through piston rod 28, expanding the flexible gasket 30 and imparting a slight bulge to the workpiece as indicated by the dotted line in Figure 1. The piston 27 and the dies 32 and 33 are then simultaneously moved to the right until they abut dies 34 and 35 as shown in Figure 2. It will be noted that during this movement, the volume of chamber 31 decreases. The displaced fluid is allowed to escape through a suitable relief valve which is set to maintain the pressure in chamber 31 at a value sufficient to force the flexible gasket into the space formed between the mating surfaces of dies 33 and 35 and 32 and 34, respectively, thus forming a single convolution. It will be seen that the convolution is formed entirely by bending rather than by drawing. Consequently, the thickness of the formed metal remains unchanged over its entire area. Further, since the bending is effected primarily by the action of the soft neoprene gasket, possibility of scratching or otherwise marring the formed metal is minimized.

The chamber 31 is then connected to exhaust through passage 29 and remains so during the balance of the cycle. The piston 27 is then moved to the left to the position shown in Figure 3. The female dies 32, 33, 34 and 35 are then moved to the right a distance corresponding to one formed convolution to the position shown in Figure 4 carrying the workpiece to the right.

The dies are then opened as shown in Figure 5. Dies 32, 33, 34 and 35 are then moved to the left, dies 34 and 35 assuming a position opposite their original position, as indicated in Figure 6. The dies are then closed with dies 32 and 33 being moved laterally as shown in Figure 7 which movement restores the dies to their original position, bringing the formed convolution into register with a guide convolution 36 in dies 34 and 35.

As the above described cycle is repeated, additional single convolutions are formed and moved to the right along the surface of guide to produce a convoluted tube of any desired length.

Where it is desirable to use a particularly sensitive bellows which is fully responsive to small variations in high internal pressures to which it is exposed, it is sometimes necessary to use metal which is too thin to withstand the pressure without deformation beyond its elastic limit. In such a case, wire reinforcing or stiffening rings may be assembled between adjacent convolutions to absorb a substantial part of the lateral load without serious restriction of the longitudinal expansion and contraction of the bellows which is the measure of its sensitivity.

Figures 8 to 14 illustrate the successive steps of a method of forming successive convolutions and assembling such wire reinforcing rings between adjacent convolutions, which serve as a part of the forming die surface and then become a permanent part of the completed bellows. The basic steps in forming the convolutions in the method illustrated in Figures 8 to 14 are the same as the steps described above in connection with the method of Figures 1 to 7. Consequently, the description of the method of Figures 8 to 14 will be limited to the modifications necessary to effect the feeding and positioning of the wire reinforcing rings 38.

As shown in Figure 8, dies 32 to 35 have been replaced by dies 39—42 which are provided with notches 43 and 44 and notches 45 and 46, respectively, at spaced points on their inner surfaces to accommodate the reinforcing rings 38. Before operation of the machine, a reinforcing ring is positioned in notches 43, 44 and 45 and a stack of rings is positioned along the outer surface of the workpiece beyond dies 39 and 40. A pair of spring loaded detent latches 49 is provided to restrain movement of the stack of rings to the right. An adjusting means for latches 49 is omitted from Figures 8 to 14 and will be explained in detail hereinafter. The latches, which are shown diagrammatically only, are rotated 90 degrees out of the position they occupy in the actual mechanism.

Figure 9:
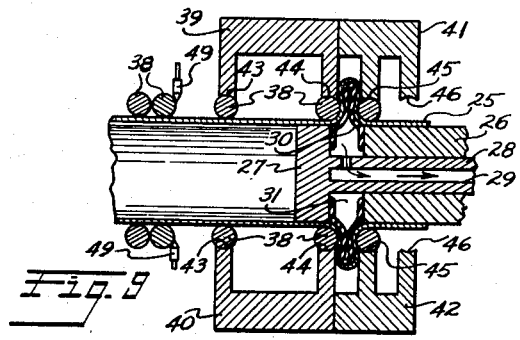
Figure 13:
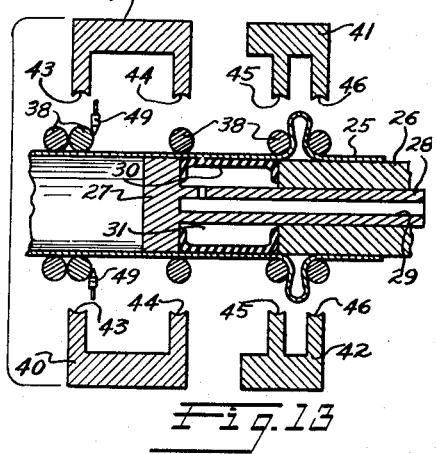
Figure 10:
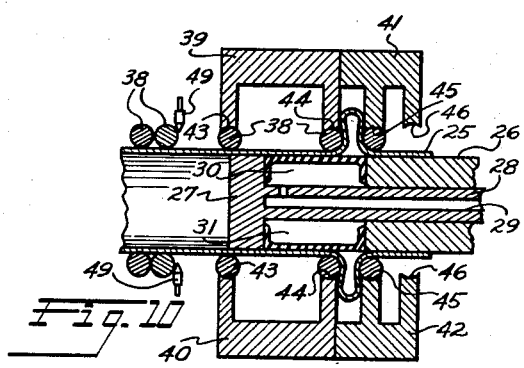
Figure 14:
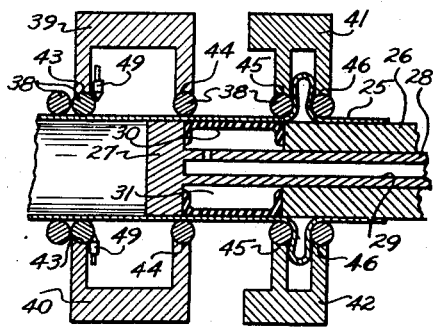
Figure 11:
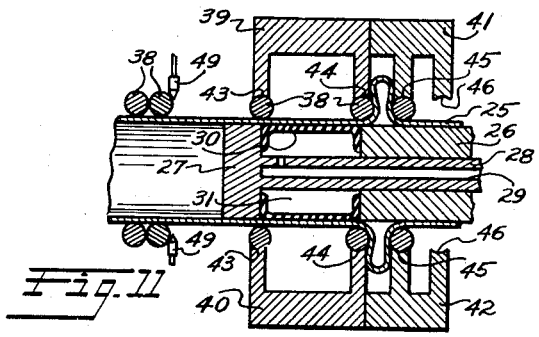

When the dies 39 and 40 and the piston 27 are moved to the right to the position of Figure 9, the ring in register with notch 43 is urged to the right with sufficient force to displace the latches 49 which return to their inward position to hold the remaining stack of rings in place as shown in Figure 9. Upon the completion of the steps illustrated in Figures 10–13, the dies 39—42 are returned to their initial position as shown in Figure 14. Because of the spacing of notches 43 and 44 and the spacing of notches 45 and 46 and the proper selection of the longitudinal displacement of the die sets during the forming operation, each of the notches will be brought into register with the next succeeding ring to the left of the ring with which it was last in register. It will be seen that the rings can be initially brought to the position shown in Figure 1 before forming the first convolution by operation of the machine through three complete cycles without the application of pressure to chamber 31.

It will be noted that the female dies diagrammatically illustrated in Figures 1 to 7 produce a straight-walled bellows convolution, while the dies shown in Figures 8–14 produce a convolution having a re-entrant portion formed partially around the reinforcing wires.

Figure 15:
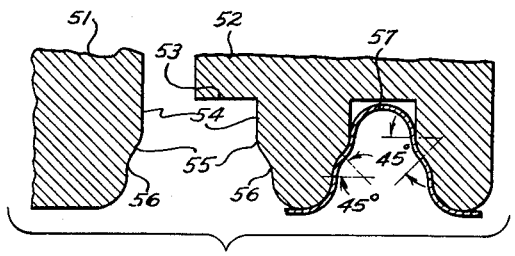
Figure 15 is a fragmentary sectional view of a modified die construction adapted for use in the method of Figures 1–7.

By using the female dies 51 and 52 shown in partial section in Figure 15, convolutions having a re-entrant portion may be produced without the wire reinforcing rings. The inner surfaces of dies 51 and 52 consist of flat surfaces 54, convex arcuate surfaces 55 and concave arcuate surfaces 56. The points of tangency of the arcuate surfaces are preferably located on lines at 45 degrees from parallel lines drawn perpendicular to the major axis of the convolution through the centers of the arcuate surfaces.

The workpiece is shaped as shown in the recess 57 of die 52. After the desired number of convolutions have been formed in the workpiece, it is removed from the machine and subjected to axial pressure by any suitable means. The portion of the convolution in engagement with surfaces 56 will snap inwardly, forming a re-entrant portion similar in shape to the convolution formed in the method of Figures 8 to 14. It has been found that this bellows configuration possesses greater flexibility for any given wall thickness than previously known constructions.

As an indication of the flexibility of the present invention, it is to be noted that the convolution forming method thus far described cannot be carried out in conventional apparatus employing solid mating male and female dies. It will be apparent that the range of the present invention can be greatly extended over known methods by the employment of a variety of die shapes, three of which have been described for purposes of illustration.

Referring now to Figures 16, 17, and 18, which illustrate one embodiment of the mechanism for carrying out the cycle shown in Figures 1–14, 60 indicates a work table on which the convolution forming machine indicated generally at 61 and an automatic stop mechanism 62 are mounted in spaced relation. Work table 60 comprises longitudinal frame members 63 to which horizontal cross members 64, 65, 66 and 67 and vertical legs 68 are rigidly attached as by welding. Spaced vertical support members 69 and 70, attached to frame members 64 and 66 as by screws 71 carry four vertically and laterally spaced guide rods 72, which are locked in place as by nuts 73 and suitable lock nuts. Slidably mounted in opposite pairs on rods 72 are four vertical frame members 74, 75, 76 and 77. Each of the support members has an internal groove 79 extending lengthwise along its inner surface and each of the members 74, 75, 76, and 77 carries a pin 80 held in place by set screws 80a on which is mounted a cam follower 81 at a point intermediate its ends on its outer surface. At a point adjacent their upper and lower ends the opposite pairs of vertical frame members 74 and 75 and 76 and 77 are rigidly attached to four identical cross members 82 as by screws 83. The adjacent sides of frame members 74, 75, 76 and 77, respectively, are smooth, allowing the members to abut in full surface contact, while their reverse sides are provided with arcuate grooves 86. Mounted for rotation in each groove 86 is a pair of circular cam plates 87 and 88, each having an elliptical central aperture 89. Received within groove 79 in the frame members 74—77, are identical guides 90 which are held in place as by screws 91. Symmetrical upper die mounting plates 93 and 94 and symmetrical lower die mounting plates 95 and 96, each having a semi-circular aperture 97 are slidably mounted on machined angular surfaces 92 of guides 90. Rigidly attached to die mounting plates 93—96 as by bolts 98, are four female dies 99—102, respectively, which are provided with suitable die faces which may take the form shown in Figures 1 to 7, 8 to 14, or Figure 15.

Received in axially aligned drilled bores 107 and 108, and 110 in die mounting plates 93, 95 and 96 respectively, and in a similar passage not shown, in plate 94, are four identical guide rods 111. Springs 112, coiled around rods 111, are compressed between the opposing mating surfaces of the die mounting plates, as shown in Figure 18 for a purpose more fully explained hereafter.

A roller 113 is mounted for rotation on a pin 114 suitably attached to the outer surfaces of each of the die mounting plates at the mid-points of their long axes adjacent to the upper edges of the upper die mounting plates and the lower edges of the lower die mounting plates as shown in Figure 18. Springs 112 urge the die holding plates apart so that the rollers 113 engage the surface of apertures 89 in the respective plates 87 and 88.

A pair of rollers 115 are mounted for rotation on pins 116, which are suitably mounted in the outer faces of cam plates 87 and 88 in the upper left quadrant of the cam plates. A pair of similar rollers 117 are mounted on pins 118 in the lower right quadrant of cam plates 87 and 88. A pair of shafts 125 and 126 are mounted for counter rotation in three spaced pairs of supports 127, 128, 129, rigidly attached to the work table by pairs of supporting members 130, 131, and 132, respectively.

Rigidly attached to shaft 125 is a cam 133 having peripheral cam tracks 134 and 135. A similar cam 136, having cam tracks 137 and 138 is rigidly mounted on shaft 126 opposite cam 133. A pair of identical camming arms 139 are rigidly attached to the opposite ends of cam 133. A pair of arms 140, angularly displaced from arms 139 are similarly attached to the opposite ends of cam 136.

Extending between support member 70 to which it is attached as by bolts 145 and the inner surface of the dies is a cylinder 146. A portion of a hollow piston assembly indicated generally at 147 is reciprocably and sealingly received within the cylinder 146. As best shown in Figures 17 and 19, the piston assembly 147 consists of a tubular member 148 reciprocably received within cylinder 146, and sealed by any suitable means such as an O-ring 149, and end plates 150 and 151 attached to the inner and outer ends of tubular member 148 as by welding. An annular flexible diaphragm 152 of neoprene, or other suitable flexible material is clamped to the tapered outer end of cylinder 146 by a plurality of circumferentially spaced screws 154. At its opposite end, diaphragm 152 is clamped against the outer tapered surface of plate 151 by a cup shaped circular clamping member 155 which is adjustably secured to plate 151 by screws 155a. The chamber 156 within tubular member 148 is in fluid communication with the annular space 157 between diaphragm 152 and member 148 through a series of circumferentially spaced ports 158. A passage 159, in register with a passage 160 in cylinder 146, connects the space 157 to atmosphere during the filling operation. When the system is filled the passage 160 is sealed by a plug 161 threaded in the cylinder 146.

A hollow piston rod 165 extends through a central aperture in plate 150 and is secured to plate 150 as by welding. At its opposite end, rod 165 is attached to a plate 166 as by screws 167. In register with the interior or rod 165, is a fluid conduit 168 threaded into plate 166 and locked in place by nuts 169.

Plate 166 is slidably mounted on reduced extension 170 of the rods 72. Enlarged mounting sections 171 are provided on opposite sides of plate 166 in the horizontal plane of shafts 125 and 126 in which cam rollers 172 are rotatably mounted on pins 173, held in place by set screws 174.

A pair of oppositely symmetrical cams 175 and 176 are mounted for rotation with shafts 125 and 126, respectively at points opposite plate 166. Cam tracks 178 and 177, in which rollers 172 are carried, are provided in cams 175 and 176, respectively.

A shaft 179, is journalled in suitable bearing supports 180 which are rigidly attached by suitable brackets to support 132. Bevel gears 182, rigidly attached to opposite ends of shaft 179, mesh with bevel gears 183 and 184 mounted for rotation with shafts 125 and 126, respectively. Rotation is imparted to shaft 125 and, through shaft 179, to shaft 126 by means of a couple 185 which in turn is drivingly connected through a shaft 186 to a speed reducer 187 (Figure 21). As shown in Figures 16 and 21 the speed reducer 187 is rigidly mounted, as by bolts 188, on frame members 189 attached to frame members 66 and 67. Also mounted on members 66 and 67, as by bolts, 190, is a motor 191 drivingly connected to speed reducer 187 by a shaft 192.

The operation of the mechanism thus far described in carrying out the cycle fully described in connection with the Figures 1 to 7 is as follows:

With the machine at rest, and the dies open and separated in the position shown in Figures 17, 18, and 19, a tubular workpiece 25 (Figures 1 and 19) is positioned around the surface of members 146 and 155. The machine is then put into operation by starting motor 191 thereby rotating shafts 125 and 126 in clockwise and counterclockwise directions as viewed from the left respectively, as shown by the arrows in Figure 18. Initially, arms 139 and 140 will occupy the full line position of Figure 18. Rotation of shaft 125 and arms 139 to the dotted line position of Figure 18 moves rollers 15 to the dotted line position. This movement of rollers 115, which are rigidly attached to circular cam plates 87 and 88, rotates the latter in grooves 86 so that the central aperture 89 assumes the dotted line position of Figure 18 and carries rollers 113 and the die holding plates (the latter moving on guides 92) to the closed position shown in dotted lines in Figure 18 where they are held by the then horizontal surface of aperture 89 against the opening action of springs 112. As the forming dies are being vertically moved to the closed position, cam tracks 135 and 138, carry rollers 81 and the die holding plates horizontally to the finally closed position illustrated diagrammatically in Figure 2. When the dies have reached the vertically closed position of Figure 1, hydraulic fluid is first supplied to chamber 157 under pressure then gradually released through conduit 168 as the dies are moved to the fully closed position of Figure 2, as explained in connection with Figures 1 to 7. An automatic means for controlling the flow of hydraulic fluid will be presently described.

Reciprocation of piston 147 is effected at the intervals described in Figures 1 to 7 by the movement of rollers 172 along cam surfaces 177 and 178.

Figure 20:
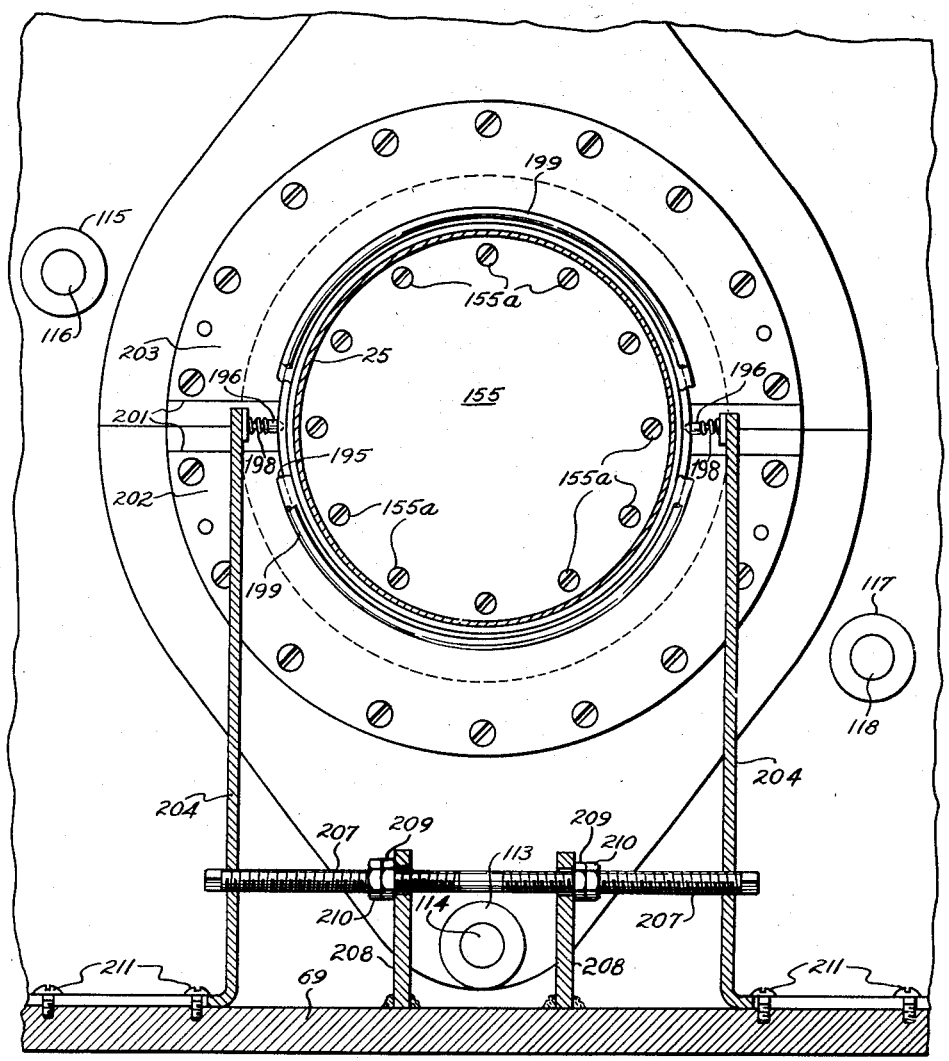
Figure 20 is a fragmentary sectional view taken along line 20—20 of Figure 19.

Referring now to Figures 19 and 20 which show a preferred mechanism for carrying out the method illustrated in Figures 8 to 14, 38 indicates reinforcing rings positioned around the outer surface of workpiece 25 in the manner diagrammatically illustrated in Figures 8 to 14. The stack of rings 38 is confined between a collar 195 slidably mounted on workpiece 25 and a pair of opposing catches 196 mounted for limited axial movement in brackets 197. Springs 198 maintain the catches 196 in resilient engagement with the innermost ring 38. A spring 199, coiled around the circumference of workpiece 25 is compressed between the movable collar 195 and a fixed collar 200, mounted by suitable brackets (not shown), on frame members 69. Brackets 197 and catches 196 are received within recesses 201 formed adjacent to the mating line of outer dies 202 and 203 so that the dies may close without interference with the catch assembly. Brackets 197 are adjustably mounted on brackets 204 by screws 205 which pass through a narrow slot 206 in the latter brackets. Brackets 204 extend downwardly and terminate in horizontal slotted sections which are attached to frame 69 as by screws 211. Correlated lateral movement of brackets 204 is effected by rotation of an adjusting member 207 having oppositely threaded sections which pass through threaded apertures in brackets 204. Members 207 is rotatably mounted on supports 208 and held against longitudinal displacement by nuts 209 and lock nuts 210.

It is felt that the function of the catch assemblies will be apparent from the description of the method of Figures 8 to 14.

It is often desirable, when making a number of similar articles on a production line basis, to stop and reset the machine automatically after a predetermined number of convolutions have been formed. To this end, the automatic stopping and resetting apparatus, indicated generally at 62 in Figure 16 and illustrated in detail in Figures 21–24 has been provided.

Referring now to Figures 16 and 21–24, suitably mounted on transverse frame members 212 are supporting brackets 213 and 214 between which extend two parallel guide shafts 215 which are held in place by nuts 216. A carriage 217 consisting of a plate 218 and transverse support 219, is reciprocably mounted on shafts 215 which pass through bushings 220 press fitted in axially aligned drilled holes in supports 219. Mounted on plate 218, as by screws 221, is a switch 222 having an actuating button 223 extending from one side, spring loaded to the closed position. Switch 222 controls a holding circuit for a manual starting switch 224 by means of a circuit including leads 225 and 226 and holding solenoid 227. The motor power circuit consists of leads 228 and 229 and switch 224 and lead 230.

A plate 233, having a slot in lateral register with a slot 232 in plate 218, is rigidly secured to the upper surface of plate 218 by any suitable means. An actuating plate 235, having a slot 236, is mounted for limited horizontal rotation above plate 233 by a bolt 237. A projection 240 extending laterally from one side of plate 235 rides in thread root 249 or on cam 247 as hereafter explained. A rod 238 is mounted for vertical rotation about its midpoint in slot 234 on a pin 239 which passes through one side of plate 233. The slots 232 and 234 which are of different lengths, are in lateral register at all times. Slot 236 moves in and out of register with slots 232 and 234, as more fully explained below. Plate 235 is held in engagement with plate 233, as the former moves, by an L-shape member 241 which is rigidly attached to plate 233 as by screws 241a.

An externally threaded rod 242 is keyed to a stud shaft 243 which is rotated by speed reducer 187. At the opposite end of rod 242, a reduced section 244 is rotatably received within a bushing 245 press fitted into support 246 which is rigidly attached to support member 214 by any suitable means, not shown. A cam 247, having an arcuate surface 248, is attached to a thread root 249 of the rod 242 by means of a screw 250. Each of the thread roots 249 is provided with a threaded hole, not shown, for receiving the screw 250 so that the cam 247 may be positioned at any desired point along the axis of rod 242. Formed as an integral part of cam 247, is an angular guide 251 positioned on the crest of an adjacent thread on rod 242. A return stop 255 is adjustably threaded into support 213 in alignment with rod 238. Mounted for rotation on support 213 is a pulley 256, over which passes a flexible cable 257 attached to one of the legs 219 at one end and to a freely hanging weight 258 at its other end.

The operation of the automatic stop and resetting mechanism is as follows:

The operating cycle is initiated by closing manual switch 224, completing the holding circuit through solenoid 227 and switch 224 and energizing the motor 191. At this time, the switch carriage 217 abuts bracket 213 and projection 240 rides in the end thread root of rod 242. In this position, slot 236 in plate 235 will be out of register with slots 232 and 234 and rod 238 will be canted in a counter clockwise direction as shown in Figure 16. Cam 247 is positioned at any desired point along the axis of rod 242, the number of threads between projection 240 and the cam 247 being equal to the number of convolutions to be formed since rod 242 revolves once each time a convolution is formed. As the rod 242 rotates, the projection 240, riding in threads 249, will advance the switch carriage 217 to the right. When projection 240 reaches cam 247 it will ride out of thread 249 on the sloping surface of cam 248 rotating plate 235 and depressing switch actuating pin 223 opening the switch 224, deenergizing solenoid 227, and the motor power circuit. The proper rotation of plate 235 is assured by the angular surface 251 of cam 247 which holds the projection 240 against the arcuate surface of cam 248 until slot 236 is aligned with slot 232 and 234 at which time rod 238 will rotate counter clockwise around pin 239 under its own weight into slot 236, locking plate 235 into its rotated position. Slight continued rotation of rod 242, due to the inertia of the system, will carry surface 251 of cam 247 free of projection 240 allowing carriage 217 to move freely to the left under the influence of weight 258. As the carriage is returned to its starting position, stop 255 will abut rod 238 rotating the latter out of slot 236. Plate 235 will then be rotated under the influence of the spring loaded button 223 into its initial position with projection 240 again riding in thread root 249. The apparatus may be restarted by closing manual switch 224.

It is to be noted that the threaded holes on which cam 247 is mounted are so positioned on the circumference of rod 242 that the apparatus will always be stopped when the dies are in the opened and separated positions as shown in Figure 17.

The preferred means for affecting automatic control of the pressure cycle of the hydraulic fluid supply to the interior of piston 147 is illustrated diagrammatically in Figure 25. As there shown, hydraulic fluid is supplied to piston 147 from a reservoir 265 through a conduit 266, a pump 267, driven by any suitable means, not shown, a conduit 268, a valve 269, and a conduit 168. A normally closed relief valve 270 is connected to conduit 268 at a point adjacent the pump 267. A return line 271 is connected to the low pressure side of valves 269 and 270 and leads to reservoir 265 through a low pressure relief valve 272. A second control valve 273 is connected to supply and return conduits 268 and 271 by conduits 274 and 275, respectively, the latter including a low pressure relief valve 276. A high pressure relief valve 277 connects conduits 274 and 275. Valves 269 and 273 are operated by solenoids 278 and 279 respectively, and are returned by respective springs 280 and 281. The operating circuit for solenoid 278 consists of power lead 285, the solenoid, lead 286, a switch 287, and power lead 288. The operating circuit for solenoid 279, includes leads 285, 289, the solenoid, lead 290, a switch 291 and leads 292 and 288. Switches 287 and 291 are mounted by means of suitable supports, not shown, adjacent cams 293 and 294, respectively which are mounted for rotation on shaft 179.

The correlated functions of the cam surfaces 134, 135, and 177 and the operating cycle of switches 287 and 291 are shown in Figure 26 which illustrates the developed cam surfaces. As there shown, the outer dies (Figures 1–7) are held stationary longitudinally as they are closed laterally to the position of Figure 1. The switch 287 is then closed, energizing solenoid 288, connecting conduits 268 and 168. Relief valve 277 is set so that a predetermined pressure will be maintained in conduit 168 to form a bulge in the workpiece as shown in the dotted line in Figure 2. Switch 291 is then closed by cam 294, energizing solenoid 279 connecting relief valve 276 to conduit 274. Continued revolution of the cams carries the outer dies and the piston head inwardly forming the convolution as shown by the upward inclination of cam surfaces 135 and 177. During this movement, fluid is allowed to escape from piston 147 through valve 276. At station 3, the switches 287 and 291 are opened by their respective cams and the pressure in piston 147 is released. From stations 4 to 5, the piston 147 is returned to its starting position (Figure 3) as shown by the downward inclination of cam surface 17. The operation of Figures 4 to 7 is then carried out as the cams are rotated through stations 5 to 0. As mentioned above the automatic stop device will stop and reset the machine when the flexible diaphragm is contracted and the dies are opened and separated as at station 7 so that the formed workpiece may be readily removed from the machine. Also it is to be noted that the machine is always stopped with switches 287 and 291 open to prevent rupture and permanent deformation of the diaphragm 152.

It will be apparent from the foregoing that the present invention provides a novel method and apparatus particularly suited for producing tubular convoluted items of superior quality on a production line basis.

Since the operation of the machine is fully automatic, only unskilled mechanics need attend the machine. Dependence on skilled, highly paid technicians is thus virtually eliminated assuring the production of articles of uniformly high quality at substantially reduced cost.

Production costs are further reduced by virtue of the flexibility of the apparatus resulting from the unique functional relationship of the forming means. By merely changing the female dies, a simple operation which may be performed by unskilled mechanics, the single basic machine may be used to form convolutions of practically any known configuration.

This application is a division of copending application Serial No. 195,033 filed November 10, 1950 now Patent No. 2,773,538.

The invention may be embodied in other specific forms without departing from the spirit or essential characteristics thereof. The present embodiments are therefore to be considered in all respects as illustrative by the appended claims rather than by the foregoing description, and all changes which come within the meaning and range of equivalency of the claims are therefore intended to be embraced therein.

What is claimed and desired to be secured by United States Letters Patent is:

1. A machine for forming ring reinforced convolutions in a tubular work piece comprising in combination, an internal support for said work piece, radially expansible resilient forming means mounted in said support, movable external means having ring engaging surfaces for positioning and supporting reinforcing rings on opposite sides of said resilient forming means and in encircling relation with a work piece on the internal support, means for radially expanding said resilient forming means to force said work piece outwardly between the rings, and means for moving one of said external support means relative to the other axially of the work piece to thereby move one of said rings toward the other after initiation of the expansion of said resilient forming means to form a convolution in the work piece.

2. A machine for forming ring reinforced wall convolutions in a tubular work piece comprising in combination; an internal support for said work piece, a radially expansible resilient forming means mounted in said support, movable external support means having ring engaging surfaces for positioning a reinforcing ring in encircling relation with said work piece adjacent each end of said forming means and in encircling relation with a work piece on said internal support, means for radially expanding said forming means, means for shifting certain of said external support means to thereby move one of said rings toward the other after initiation of the radial expansion of said forming means to form a convolution between said rings, and means for moving said external support means and said convolution with respect to said forming means and said support to position an unformed portion of the work piece opposite said resilient forming means for a subsequent forming operation.

3. A machine for forming ring reinforced wall convolutions in a tubular work piece comprising in combination; an internal support for said work piece, a hollow fluid tight expansible chamber in said support; movable external support means having ring engaging surfaces for positioning a reinforcing ring in encircling relation with said work piece adjacent the opposite ends of said expansible chamber, means for expanding said chamber means for moving certain of said external support means to thereby move one of said rings toward the other after initiation of the expansion of said chamber to form a convolution in said work piece between said rings; and means for contracting said chamber after said convolution is fully formed.

4. A machine for forming ring reinforced wall convolutions in a tubular work piece comprising in combination; an internal support for said work piece; a hollow fluid tight expansible chamber in said support, movable external support means having ring engaging surfaces for positioning a reinforcing ring in encircling relation with said work piece adjacent each end of said chamber, means for forcing the wall of said chamber radially outward, means for moving certain of said external support means to move one of said rings toward the other after the wall of said chamber is forced radially outward to thereby form a convolution in said work piece between said rings; means for withdrawing the wall of said chamber from said convolution after said convolution is fully formed, and means for shifting said support means, said formed convolution and said rings axially along said internal support to position an unformed portion of said work piece opposite said chamber for a subsequent forming operation.

5. In a machine for forming ring reinforced wall convolutions in a tubular work piece, hollow radially expansible flexible forming means adapted to be positioned internally of said work piece; movable external support means having ring engaging surfaces for positioning reinforcing rings in encircling relation with said work piece adjacent opposite ends of said forming means; means for moving one of said external support means to thereby move one of said reinforcing rings toward the other; means effective just before and during said movement of said ring for applying fluid at a predetermined pressure to the interior of said flexible forming means to displace said flexible forming means radially outward to force the wall of said work piece radially outwardly between said rings to form a convolution therein; means operable after said rings are moved together to relieve said fluid pressure to permit said forming means to move radially inward out of said convolution; and means for relatively moving said work piece and said forming means to position another wall portion of said work piece adjacent said flexible forming means.

6. A machine for forming ring reinforced wall convolutions in a tubular work piece comprising in combination; an internal support for said workpiece, an expansible chamber in said support, movable external support means having ring engaging surfaces for positioning a reinforcing ring in encircling relation to said workpiece adjacent each end of said chamber, means for expanding said chamber, means effective after at least partial expansion of said chamber for moving certain of said external support members to move one of said rings toward the other to form a convolution between said rings, and means for moving said external support means with respect to said internal support to position an unformed portion of the workpiece opposite said chamber with one of said elements adjacent one end of said chambere for a subsequent forming operation.

7. The combination of claim 6 together with additional means for positioning an additional reinforcing ring adjacent the opposite end of said chamber after said unformed portion of the work piece has been positioned opposite said chamber.

8. A machine for forming ring reinforced wall convolutions in a tubular workpiece comprising in combination: an internal support for said workpiece; an expansible chamber in said support; a first external support means having ring engaging surfaces for positioning a reinforcing ring adjacent one end of said chamber and encircling the outer surface of said workpiece; a second external support means for positioning a second ring adjacent the opposite end of said chamber and encircling the outer surface of said workpiece, said second external support means also carrying a third ring in spaced relation with said second ring; means for expanding said chamber; means for moving said second external support means toward said first external support means after said chamber has been partially expanded to form a convolution between the first and second element; means for contracting said chamber; and means moving each of said external support means along said support to position an unformed portion of said workpiece opposite said chamber and position said second and third element adjacent opposite ends of said chamber.

9. A machine for forming a series of ring reinforced wall convolutions in a tubular workpiece comprising in combination; an internal support for said workpiece, a flexible forming means in said support, means having ring engaging surfaces for positioning reinforcing element in spaced relation encircling the outer surface of said workpiece adjacent to said forming means, means for forcing said forming means radially outward between said element, means effective after the outward displacement of said forming means has been initiated to move said positioning means together to thereby form a convolution between said rings, means for displacing said positioning means to carry the formed convolution along said support a distance equal to width of the formed convolution, and means for displacing said positioning means an equal distance in the opposite direction along said support independently of said workpiece to restore the positioning means to their original position to permit the formation of another wall convolution in said workpiece.

References Cited in the file of this patent

UNITED STATES PATENTS

| | | |
|---|---|---|
| 605,195 | Birtwisle | June 7, 1898 |
| 808,833 | Goldstein | Jan. 2, 1906 |
| 1,689,620 | Clifford | Oct. 30, 1928 |
| 1,702,047 | Fulton et al. | Feb. 12, 1929 |
| 1,733,455 | Ferrand | Oct. 29, 1929 |
| 1,774,231 | Harnsberger | Aug. 26, 1930 |
| 1,879,663 | Dreyer | Sept. 27, 1932 |
| 2,106,495 | Debor | Jan. 25, 1938 |
| 2,106,496 | Debor | Jan. 25, 1938 |
| 2,306,018 | Fentress | Dec. 22, 1942 |
| 2,581,787 | Dreyer | Jan. 8, 1952 |